March 20, 1962     W. KOSHABA ET AL     3,025,713
BRAKE ACTUATING MECHANISM FOR MOTOR VEHICLES
Filed Feb. 25, 1960     2 Sheets-Sheet 2
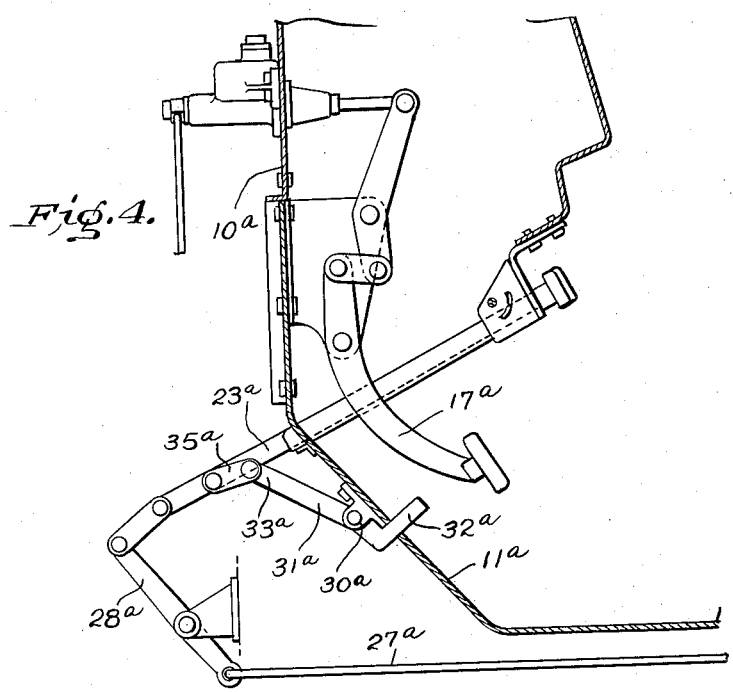
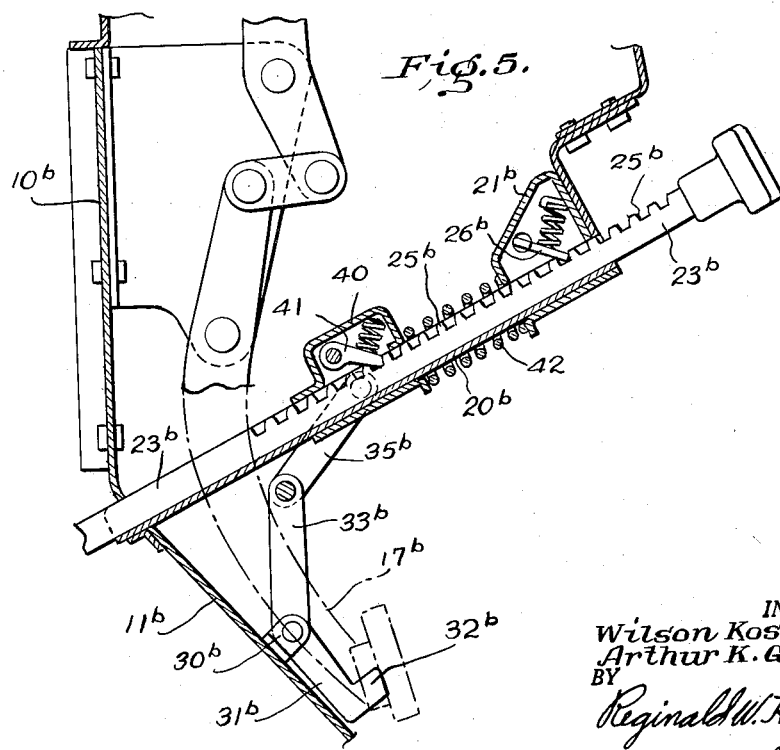
INVENTORS
Wilson Koshaba and
Arthur K. Green
BY
Reginald W. Hoagland
ATTORNEY

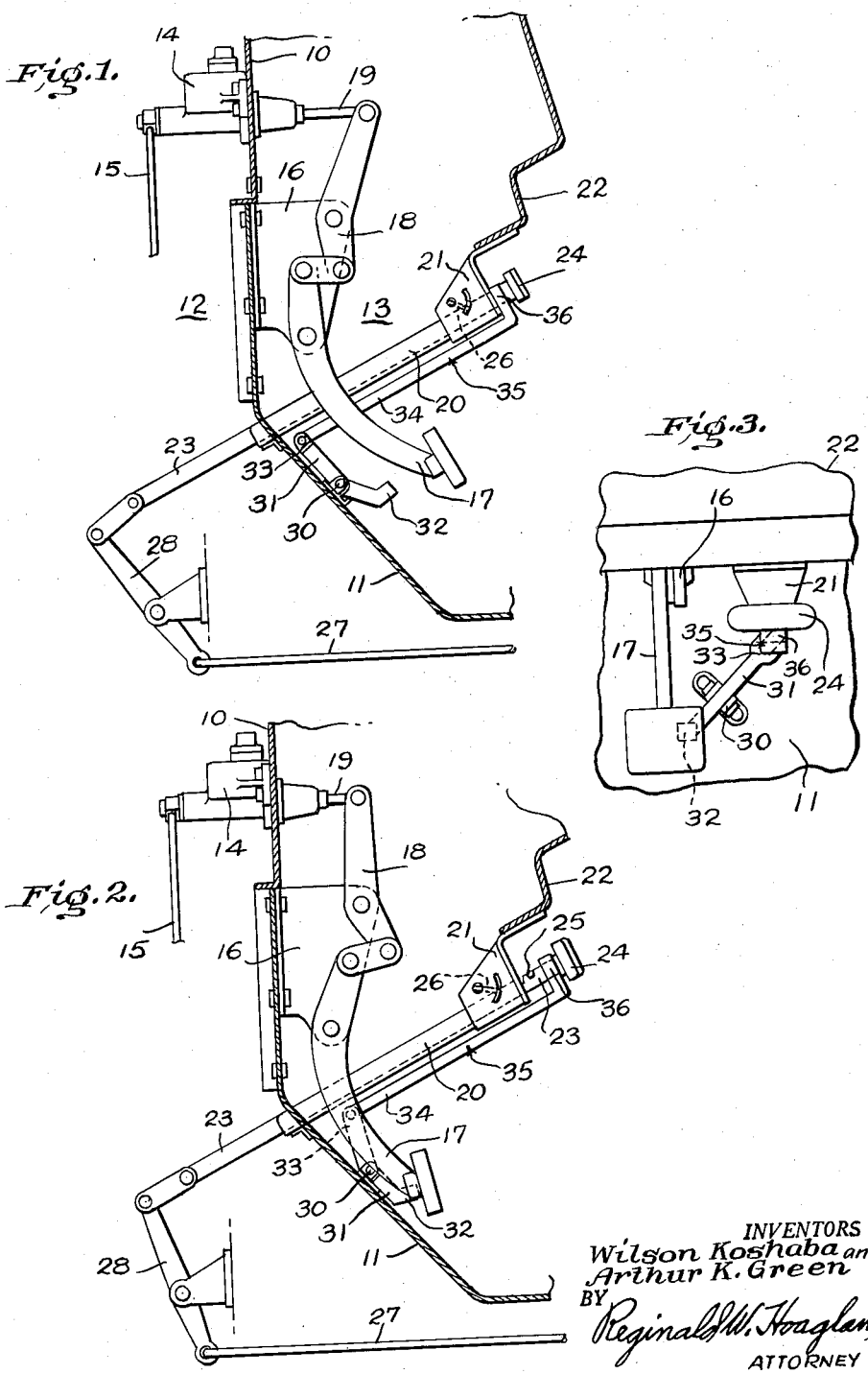

United States Patent Office

3,025,713
Patented Mar. 20, 1962

3,025,713
BRAKE ACTUATING MECHANISM FOR MOTOR VEHICLES
Wilson Koshaba, 3510 Comstock Ave., and Arthur K. Green, 140 E. Alma St., both of Flint, Mich.
Filed Feb. 25, 1960, Ser. No. 10,901
4 Claims. (Cl. 74—478)

The present invention relates to automotive brake systems consisting of foot operated service brakes and hand operated emergency brakes constructed and arranged relative to one another so that the emergency brakes are automatically applied should the service brakes fail to function when called upon for braking action.

The purpose of the invention is to quickly and efficiently apply the normal hand operated mechanical emergency brakes by foot pressure on the service brake pedal when there is inadequate pressure in the lines of the hydraulic service brakes to render a braking action. The lack of pressure, which is commonly caused by the loss of braking fluid, permits a longer stroke of the brake pedal and it is this extended length of pedal stroke that is harnessed to operate the mechanical emergency brakes. There is provided a cross arm pivoted intermediate its ends to the floor board or an adjacent part of the vehicle which has one of its ends in the path of excessive movement of the service brake pedal while its opposite end is connected through the medium of a link-like element to the customary hand lever of the mechanical emergency brakes.

It is accordingly an object of the invention to provide a novel structure for actuating the emergency hand brakes of a vehicle by the force applied to the service brake pedal upon non-operation of said service brakes.

Another object of the invention is to provide, in a device of the character set forth, a mechanism requiring a separate hand operation to release the emergency hand brakes after application thereof by operation of the service brake pedal.

A further object of the invention is to provide, in a mechanism of the character set forth, a novel construction whereby a longer stroke and greater pressure is applied to the emergency brakes by manual application of a pumping action to the service brake pedal.

It is also an object of the invention to provide a device of the above-indicated character which is simple and substantial in construction, inexpensive to manufacture, and thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

FIGURE 1 is a fragmentary longitudinal and vertical section taken at the engine fire wall and front floor board of a motor vehicle, showing the present invention thereon and in a non-braking position;

FIGURE 2 is a sectional view similar to FIGURE 1, showing the parts in a braking position;

FIGURE 3 is a fragmentary elevation of the invention as viewed by the driver of the vehicle;

FIGURE 4 is a sectional view also similar to FIGURE 1, showing a slightly modified form of the invention; and FIGURE 5 is an enlarged sectional view taken through the hand lever of the emergency brakes, showing a further modified form of the invention.

Referring more specifically to the accompanying drawings, wherein like numerals designate similar parts throughout the various views, attention is first directed to FIGURES 1, 2 and 3 which show a fire wall 10 and the slanting floor portion 11 thereof separating an engine compartment 12 from a passenger compartment 13 of a motor vehicle. Mounted on the fire wall 10 and mainly within the engine compartment 12 is the master cylinder 14 of hydraulic service brakes which also includes wheel cylinders (not shown) and in communication with said master cylinder by the tubular connection 15. Also mounted on said fire wall but within the passenger compartment is a bracket 16 pivotally supporting a pedal 17 connected through a linkage mechanism 18 to a push rod 19 on the piston (not shown) in the master cylinder. The piston within the master cylinder receives the mechanical pressure from the pedal 17 and exerts pressure on the fluid in the system, building up hydraulic pressure, which moves the wheel cylinder pistons and thus operates the service brakes.

Mounted on and extending through the slanting floor portion 11 of the fire wall 10 is the lower end portion of a channel-like guide 20 which has its upper end portion secured by a box-like housing 21 to the instrument panel 22 of the motor vehicle and which both slidably and rotatably support a hand operated lever 23 of the emergency brakes. There is a hand knob 24 on the upper end of the lever 23 and there are rack teeth 25 along said lever which are engaged by a pawl 26 of a ratchet mechanism within the box-like housing 21. The teeth 25 and pawl 26 hold the lever against endwise sliding movement in a downward direction until manual rotation of the lever 23 to a position that disengages the teeth from the pawl.

Connected to the lower end of the lever 23 for exerting a forward pull on a cable or rod 27 upon a rearward pull on the lever 23 is an arm 28 pivoted intermediate its ends to a structural part of the vehicle. The cable or rod 27 is in turn connected to and applies a braking action to the rear emergency brakes upon said forward pull thereto.

The improved brake actuating mechanism which we are about to describe and which forms the subject of this invention has been especially adapted for use in conjunction with automotive braking systems of the above defined character. However, it is to be understood that the detail construction of the invention may vary slightly in accordance with different makes of motor vehicles.

There is secured on the upper side of the slanting floor portion 11 of the fire wall 10 at a location substantially midway between the lever 23 and the foot pad of the pedal 17 a small U-shaped bracket 30 into which is pivotally supported intermediate its ends a cross arm 31 with one end upturned and under the foot pad, as at 32, and with the other end 33 directed towards and terminating slightly short of the lever 23. Pivotally connected to the end 33 of the pivoted cross arm 31 is the lower end of one leg 34 of an L-shaped bar 35 positioned along side of the lever 23 and having its other leg 36 turned towards and connected to the lever 23 under the hand knob 24 thereon for movement with said lever.

Under normal conditions and while the hydraulic service brakes are functioning properly, the foot pad of the pedal 17 is stopped in its forward downward stroke by the compression of braking fluid in the system prior to engagement of the under side of said foot pad with the upturned end 32 of the cross arm 31. However, should a leak occur in one of the lines leading to a wheel cylinder and brake fluid has escaped from the system sufficient to render the service brakes useless, said pedal will be permitted to swing past its normal brake applied position and impart downward movement to the end 32 of the cross arm 31. This downward movement will cause the opposite end 33 of the crosss arm 31 to raise, and because of its connection to the hand lever 23 will slide said lever in an upward direction, thus applying the emergency hand brake to slow down or effect a stop. The ratchet mechanism for holding the hand brakes on, will require that the hand lever 23 be manually released after each application of the brakes. The purpose of this is to remind the driver of the vehicle that the hydraulic service brakes are not working and should be fixed.

FIGURE 4 of the drawings, which is directed to a modified form of the invention, shows a cross arm 31a pivotally mounted, as at 30a, to the under side of the slanting floor portion 11a of the fire wall 10a and having the upturned end 32a of said arm extended through a hole in the floor portion 11a for engagement with the underside of a foot pad on the pedal 17a. The other end 33a of the pivoted cross arm 31a is connected by a link 35a to the slidable and rotatable lever 23a for exerting a pull through the arm 28a to the cable or rod 27a connected to the emergency brakes (not shown).

In FIGURE 5, there is shown a further modified form of the invention, wherein a cross arm 31b similar to that shown in the preferred embodiment of the invention is pivoted, as at 30b, on the upper side of the slanting floor portion 11b of the fire wall 10b and has an upturned end 32b thereof in the path of movement of a foot pad of a service brake pedal 17b. The other end 33b of the cross arm 31b is connected by a link 35b to a box-like housing 40 slidably mounted on a channel-like guide 20b and having therein a spring urged pawl 41 in engagement with rack teeth 25b slidable in said channel-like guide. The box-like housing 40 with the pawl 41 therein are for producing a jacking action to the lever 23b and are entirely separate from the usual fixed box-like housing 21b and pawl 26b that hold said lever in position with the hand brakes on, until manually released by rotating the lever 23b. There is a coil spring 42 around the channel-like guide and bearing at its opposite end against the box-like housings 21b and 40 so as to return the slidable box-like housing 40 and its pawl to their downward initial positions upon the release of manual pressure on the pedal 17b. It can thus be seen that a pumping action on the pedal 17b when the service brakes are not working will create ample movement to the lever to apply the emergency hand brakes.

In view of the foregoing description taken in conjunction with the accompanying drawings, it is believed that a clear understanding of the construction, operation, and advantages of the invention will be quite apparent to those skilled in the art. A more detailed description is accordingly deemed unnecessary.

While we have herein described specific forms which the invention may take, it will be understood that changes and modifications may be made which still fall within the spirit and scope of the appended claims.

What is claimed is:

1. In an emergency brake actuating mechanism for a motor vehicle having a fire wall, having a hydraulic service brake actuated by a foot-operated service brake pedal, a mechanical emergency brake arranged to effect braking action proportional and in direct response to axial movement of a rod rearwardly from said fire wall, and ratchet means arranged to releasably restrain said rod from axial movement in one direction to retain said emergency brake in an engaged position, the combination comprising, a U-shaped bracket mounted on said fire wall, a cross arm pivotally supported intermediate its ends on said bracket and having a first end thereof arranged to be contacted and depressed by the back side of said pedal when said pedal upon failure of said service brake is depressed beyond a predetermined range of motion for effecting normal operation of said service brake, and link means pivotally connected to the other end of said cross arm and to said rod to move said rod axially and to effect braking action of said emergency brake directly responsive and proportional to movement of said pedal when said pedal is in contact with said first end of said cross arm.

2. In an emergency brake actuating mechanism for a motor vehicle having a fire wall, a hydraulic service brake actuated by a foot-operated service brake pedal, a mechanical emergency brake arranged to effect braking action proportional and in direct response to movement of an axially-movable, hand-releasable rod, and ratchet means arranged to releasably restrain said rod from axial movement in one direction to retain said emergency brake in an engaged position, the combination comprising, a U-shaped bracket mounted on said fire wall, a cross arm pivotally supported intermediate its ends on said bracket and having an upturned first end thereof arranged to be contacted and depressed by the back side of said pedal when said pedal upon failure of said service brake is depressed beyond a predetermined range of motion for effecting normal operation of said service brake, and an L-shaped bar one leg of which is arranged parallel to said rod and pivotally connected at its lower end to the other end of said cross arm, the other leg of said bar being connected to said rod near the upper end thereof, to move said rod and effect braking action of said emergency brake directly responsive and proportional to movement of said pedal when said pedal is in contact with said first end of said cross arm.

3. In an emergency brake actuating mechanism for a motor vehicle having a fire wall, a hydraulic service brake actuated by a foot-operated service brake pedal, a mechanical emergency brake arranged to effect braking action proportional and in direct response to movement of an axially-movable, hand-releasable rod and ratchet means arranged to releasably restrain said rod from axial movement in one direction to retain said emergency brake in an engaged position, the combination comprising, a U-shaped bracket mounted on the forward side of said fire wall, a cross arm pivotally supported intermediate its ends on said bracket and having an upturned first end thereof extending rearwardly through an aperture in said fire wall and arranged to be contacted and depressed by the back side of said pedal when said pedal upon failure of said device brake is depressed beyond a predetermined range of motion for effecting normal operation of said service brake, link means pivotally connected to the other end of said cross arm and to said rod to move said rod axially and to effect braking action of said emergency brake directly responsive and proportional to movement of said pedal when said pedal is in contact with said first end of said cross arm.

4. In an emergency brake actuating mechanism for a motor vehicle having a fire wall, having a hydraulic service brake actuated by a foot-operated service brake pedal, a mechanical emergency brake arranged to effect braking action proportional and in direct response to axial movement of a rotatable, axially-movable, hand-releasable rod having a plurality of teeth therein arranged to be releasably engaged by a spring-urged pawl pivotally mounted within a housing connected to said vehicle to restrain said rod from axial movement in the direction effecting release of said emergency brake, and to be disengaged from said pawl to release said emergency brake when said rod is rotated about its longitudinal axis, the combination comprising, a channel-like guide surrounding said rod and connected to said vehicle, a second housing slidably mounted on said guide, a second spring-urged pawl pivotally mounted in said second housing and arranged to releasably engage said teeth in the same direction in which said teeth are engaged by said first pawl and to be disengaged from said teeth when said rod is rotated about its longitudinal axis, a coil spring surrounding said guide intermediate said housings and bearing against said housings to yieldingly urge movement of said second housing upon said guide in the direction in which said rod is restrained from movement by said pawls, a cross arm pivotally mounted intermediate its ends to said vehicle and having a first end thereof arranged to be contacted and depressed beyond a predetermined range of motion for effecting normal operation of said service brake, link means pivotally connected to the other end of said cross arm and to said housing to move said rod axially by jacking action and to effect braking action of said emergency brake directly responsive and proportional to cumulative depression of said pedal when the back side of said pedal is in contact with said first end of said cross arm.

References Cited in the file of this patent

UNITED STATES PATENTS

| | | |
|---|---|---|
| 1,662,183 | Chann | Mar. 13, 1928 |
| 2,065,459 | Jenkins | Dec. 22, 1936 |
| 2,154,929 | Edwards | Apr. 18, 1939 |
| 2,670,057 | Ellcock | Feb. 23, 1954 |
| 2,720,293 | Brinkmeyer | Oct. 11, 1955 |
| 2,817,420 | Ulinski | Dec. 24, 1957 |
| 2,841,251 | Shelton | July 1, 1958 |